Oct. 30, 1928.

A. T. KASLEY 1,689,672

BALANCING MACHINE

Filed April 10, 1924

WITNESSES:

A. T. Kasley
INVENTOR

BY

ATTORNEY

Patented Oct. 30, 1928.

1,689,672

UNITED STATES PATENT OFFICE.

ALEXANDER T. KASLEY, OF MOORE, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed April 10, 1924. Serial No. 705,619.

My invention relates to balancing machines of the combined static and dynamic type and it has for its object to provide apparatus of the character designated which shall be capable of securing both static and dynamic balance of a body accurately and expeditiously.

Figure 1:
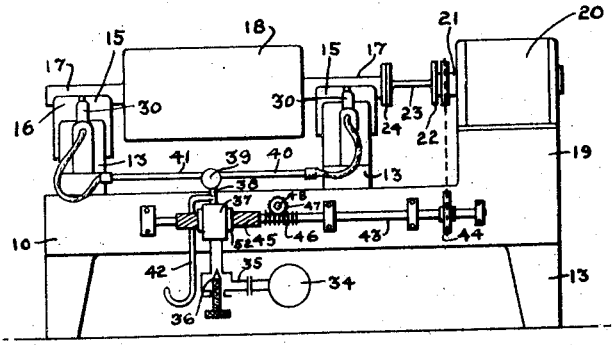
Figure 2:
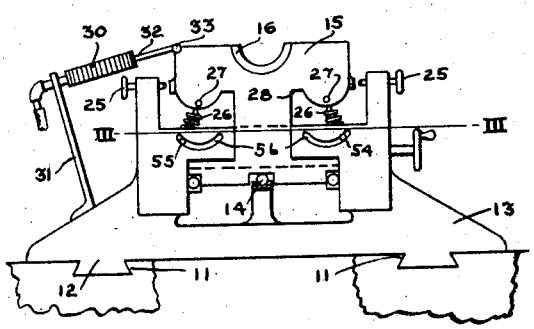
Figure 3:
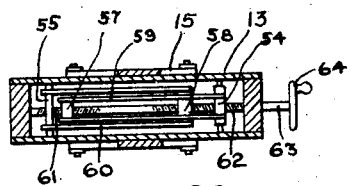
Figure 4:
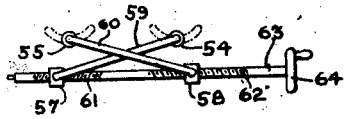
Figure 5:
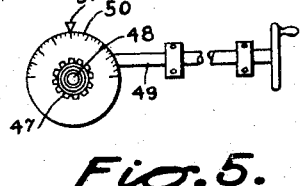

Apparatus embodying features of my invention is illustrated in the accompanying drawings forming a part of this application, in which Fig. 1 is a side elevation of a balancing machine showing my improved balancing devices applied thereto; Fig. 2 is an end elevation of one of the balancing devices shown in Fig. 1; Fig. 3 is a sectional view taken along the line III—III of Fig. 2; Fig. 4 is a detail view showing one part of the mechanism; and Fig. 5 is a detail view of another part of the mechanism shown in Fig. 1.

My present invention constitutes an improvement in some respects over the invention disclosed and claimed in my Patent No. 1,553,941, dated September 15, 1925, and assigned to the Westinghouse Electric and Manufacturing Company. The improvement consists more particularly in an arrangement of springs for the pendulum member together with a single-acting motor device connected to said member, the springs being so arranged that their angles of inclination may be simultaneously varied in opposite directions so as to secure an extremely accurate degree of adjustment thereof in developing a component spring force which shall be equal and opposite to the force of the motor device.

Referring now to the drawings for a more detailed description of my invention, in Figs. 1 and 2, I show a machine frame or bed plate at 10, having longitudinal machined grooves 11—11 to receive tongues or securing members 12 carried by the stationary supporting structures or pedestals 13—13. The stationary supporting structures or pedestals 13 have pivotal connections of any suitable type at 14 with respect to vibratory members or pedestals 15—15, which have bearings at 16 for the trunnions 17 of a body 18 to be balanced. The machine frame or bed plate 10 has a support 19 at one end for a suitable motor 20 and the motor has its armature shaft 21 connected to one of the trunnions 17 in a flexible manner, as by a coupling 22, a flexible shaft 23, and a coupling 24, in order to permit vibrations of the body. It is to be understood that the flexible shaft indicated is referred to by way of example only and that any suitable driving connections, such as magnetic clutches or other suitable couplings, well known to those skilled in the art, may be employed for connecting the driving motor to the body to be balanced.

Set screws 25—25 are carried by the stationary supporting structure or pedestals 13—13 for the purpose of holding one of the pendulum members while the other is free so that the method of balancing at one end at a time to secure correction for both static and dynamic unbalance may be carried out, as more specifically set forth in my application aforesaid. Springs 26 are pivotally connected at 27 to the under sides of the outer portions of the T-head portions 28 of the vibratory members or pendulums 15. The springs 26 are utilized both for the purpose of securing resonance when a synchronous speed of the body being balanced is reached and for the purpose of offering a reactive force which shall be equal and opposite to the force developed by the impulse-applying means as more fully hereinafter set forth.

The means for applying impulses to the vibratory members or pendulums 15 in order to oppose the inertia impulses applied thereto due to the unbalance of the body preferably comprise single-acting sylphon bellows mechanisms 30—30 connected to brackets 31 carried by the stationary supporting or pedestal structures 13 and having their movable ends 32 connected to the vibratory members or pendulums 15 at 33. Elastic fluid, such as compressed air, is supplied to the sylphons under the proper pressures and at the proper times in order to oppose the inertia impulses.

In Fig. 1, and as more fully disclosed in my patent aforesaid, I show a source of fluid under pressure at 34 which is connected by means of a conduit 35, containing a throttle valve 36, to a suitable rotary valve 37 which is connected by means of a conduit 38 to a two-way valve 39, which is adjustable to connect the conduit 38 with either the conduit 40 or the conduit 41 leading to the respective sylphon mechanisms. A pressure-indicating or manometric device 42 is associated with the conduit 38 so as to indicate the pressure of fluid being supplied to the sylphon mechanism 30 and the degree of pressure is varied by adjusting the throttle valve 36.

The timing of the sylphon impulses is effected by adjustment of the rotary valve 37. Referring to Fig. 1 it will be seen that I show a countershaft 43 which is driven from the armature shaft 21 by any suitable one-to-one ratio gearing, as by sprocket gearing 44. A steep-pitched threaded sleeve 45 is splined to the shaft 43 and it has one end provided with circumferential tooth portions 46 which mesh with an actuating pinion 47, the latter being connected to any suitable manual actuating device and to an angle indicator as more particularly set forth in my application aforesaid. For example, I show in Fig. 5 the pinion 47 connected to a shaft 48 which may be adjusted in either direction by means of a manually actuated member or shaft 49 connected to the shaft 48 in any suitable manner, as by worm gearing, not shown. The shaft 48 has connected thereto, in any suitable manner, a dial 50 which cooperates with a pointer 51 to indicate the angle of adjustment. The threads of the sleeve 45 fit interior threads of an internal rotary valve member 52 which controls the supply and exhaust of fluid to and from the sylphon mechanism. As the sleeve 45 is shifted longitudinally, the valve member 52 is caused to either lead or lag with respect to the body being balanced so that the fluid-pressure impulses developed by the sylphon and applied to a pendulum 15 may be so timed as to oppose the inertia impulses applied thereto due to the unbalanced condition of the body being balanced.

In accordance with my present invention, I utilize single-acting sylphon mechanisms and depend upon spring means for developing equal and opposite reactive impulses, that is to say, the springs 26 are deformed while the corresponding sylphon mechanism is active and the energy stored in the springs becomes effective as soon as the fluid under pressure is released from the sylphon mechanism. As the rotary valve 37 is provided with supply and exhaust ports which are placed in communication with a sylphon mechanism, each for almost 180° of rotation of the rotor, it will be apparent that the fluid pressure and spring impulses are supplied to a pendulum 180° apart; and if these impulses are properly timed and are of the proper magnitude, the inertia impulses due to unbalance may be damped out.

In order to secure a fine adjustment of the reactive effect of the springs 26 with respect to a sylphon mechanism, I provide movable members or blocks 54 and 55 for the outer ends of the springs 26, the blocks being movable in arcuate guides 56—56 which are preferably concentric with the pivotal connections 27 when the pendulum is in a median position. The blocks 54 and 55 are respectively connected to nut members 57 and 58 by means of suitable links 59 and 60, the nut members 57 and 58 fitting oppositely threaded portions 61 and 62 of a shaft 63 having a manually actuating device 64 carried thereby. If the shaft 63 is turned in one direction, the nut members 57 and 58 are caused to approach with the result that the blocks 54 and 55 move outwardly in opposite directions. Opposite movement of the shaft 63 results in movement of the blocks 54 and 55 inwardly in opposite directions. The inclination of the springs 26 may, therefore, be very accurately adjusted with respect to a pendulum 15 so as to have a component of the reactive forces thereof equal and opposed to the force of the sylphon mechanism. It will be noted that the adjustment of the springs 26 is not accompanied by any change in the tension thereof but that the inclination thereof does change the extent of elongation per unit of amplitude of vibration, so that the manner of change in the angle of inclination results in the possibility of the application of a finely regulable spring force to the pendulum.

Apparatus made in accordance with my invention operates as follows: A rotor to be balanced is placed in the bearings 16 of the pendulums 15, the set screws 25 are retracted, and the rotor is then brought up to testing speed. If the rotor vibrates, this indicates that it is out of balance. Then the set screws 25 are screwed up so as to hold one pendulum 15 while the other is free for vibration. The two-way valve 39 is moved so as to connect the conduit 38 with the conduit 40 or 41 which communicates with the sylphon mechanism 30 associated with the then free pendulum. The throttle valve 36 is opened slightly in order to admit slight pressure to the valves and to the sylphon mechanism. The sleeve 45 is then moved longitudinally in order to cause the fluid-pressure impulses to vary in phase with respect to the inertia impulses. If the inertia and fluid-pressure impulses are in phase, vibration of the pendulum is accentuated; whereas, if the inertia and fluid-pressure impulses are opposite, the phase vibration of the pendulum will be reduced. Accordingly, therefore, I move the sleeve 45 longitudinally in order to determine the point of minimum vibration and, therefore, a relation of opposition of impulses. It is better to observe the point of maximum vibration and then to measure back 180° in order to determine the positions of minimum vibration. After a setting of the rotary valve 37 has been attained which is accompanied by a minimum amount of vibration, the throttle valve 36 is opened wider until sufficient pressure of fluid is applied to the sylphon mechanism to eliminate vibrations. If the pressure of fluid to the sylphon mechanisms is varied, it may be necessary to change the inclination of the springs 26 in order to maintain equal and opposite forces applied to the pendulum alternately for each 180° of rotation of the rotor. The positions of unbalance on the rotor may be determined by observing the angle through which the dial 50 has been shifted and the magnitude of the unbalancing mass may be determined from the reading of the manometric or pressure-indicating device 42.

After the extent and location of unbalance for one end of the rotor is determined in the manner just described, the same operations are carried out in connection with the other end; and, after the positions and extent of unbalance are determined for each end, the resultant mass to be added to each end of the rotor to place it in static and running balance may be determined as set forth in my application aforesaid, or the three-mass balancing method set forth in my Patent No. 1,553,941 dated September 15, 1925, may be employed.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a balancing machine, the combination of a vibratory supporting member for a body to be balanced, springs inclined and connected at opposite sides of the supporting member, and common means for simultaneously changing the effectiveness of the springs.

2. In a balancing machine, the combination of a vibratory supporting member for a body to be balanced, springs connected at opposite sides of the supporting member, and means for changing the inclination of the springs.

3. In a balancing machine, the combination of a vibratory supporting member for a body to be balanced, springs connected at opposite sides of the supporting member and means for simultaneously changing the inclination of the springs to an equal but opposite extent.

4. In a balancing machine, the combination of a vibratory supporting member for a body to be balanced, springs connected at opposite sides of the supporting member, means for applying timed impulses to one side of the supporting member, and means for varying the effectiveness of the springs without changing the tension thereof.

5. In a balancing machine, the combination of a vibratory supporting member for a body to be balanced, means for applying timed impulses to one side of the supporting member, springs connected to opposite sides of the supporting member, and means for changing the inclination of the springs.

6. In a balancing machine, the combination of a stationary support, a vibratory member carried thereby for supporting a body to be balanced, means carried by the stationary support for applying impulses regulable in time and magnitude to the vibratory member, springs pivotally connected to opposite sides of the vibratory member, movable supports carried by the stationary support and connected to the other ends of the springs, and means for simultaneously moving the supports in opposite directions.

7. In a balancing machine, the combination of a stationary support, a vibratory member carried thereby for supporting a body to be balanced, springs pivotally connected to opposite sides of the vibratory member, supports for the other ends of the springs movable in paths concentric with the axes of the respective pivotal connections when the pendulum is in a median position, and means for adjusting the positions of the supports in their respective paths of movement.

8. In a balancing machine, the combination of a vibratory member for supporting a body to be balanced, stationary supporting structure for the member and having arcuate guides at opposite sides, movable members carried by the guides, springs connected to opposite sides of the vibratory member and to the movable members, and means for simultaneously adjusting the positions of the movable members in opposite directions.

9. In a balancing machine, the combination of a stationary structure, a vibratory member carried thereby for supporting a body to be balanced, a fluid motor carried by the stationary structure and having its actuated element connected to the vibratory member, springs connected to opposite sides of the vibratory member and to the stationary structure, and means for changing the angles of inclination of the springs to the same extent but oppositely.

10. In a balancing machine, the combination of a stationary structure, a vibratory member carried thereby for supporting a body to be balanced, a single-acting fluid motor device carried by the stationary structure and having its actuated element connected to the vibratory member, springs connected to opposite sides of the vibratory member, and means for simultaneously changing the angles of inclination of the springs so as to develop reactive spring forces which are substantially equal and opposite to the forces developed by the motor device.

11. In a balancing machine, the combination of a vibratory member for supporting a body to be balanced, a single-acting sylphon mechanism connected to one side of the vibratory member, a spring connected to the opposite side of the vibratory member, and means for adjusting the angle of inclination of the spring.

12. In a balancing machine, the combination of a pendulum for supporting a body to be balanced, a single-acting sylphon mechanism having its movable element connected to the pendulum, springs connected to opposite sides of the pendulum, and means for simultaneously adjusting the inclination of the springs in opposite directions.

13. In a balancing machine, the combination of a stationary supporting structure, a pendulum member carried thereby for supporting a body to be balanced, a single-acting sylphon mechanism carried by the stationary structure and having its movable end connected to the pendulum, movable members carried by the stationary supporting structure, springs connected to the sides of the pendulum and to the movable members, an oppositely-threaded shaft carried by the stationary supporting structure, nut members on the shaft, and links for connecting the nut members to the respective movable members.

14. In a balancing machine, the combination of a pendulum member for supporting a body to be balanced, a stationary supporting structure for the pendulum, springs pivotally connected to opposite sides of the pendulum, said stationary supporting structure having guides which are concentric with the respective pivotal connections when the pendulum is in a median position, blocks carried by the guides and connected respectively to the springs, an oppositely threaded shaft carried by the stationary structure, nut members on the shaft, links for connecting the nut members to the respective blocks, a sylphon mechanism carried by the stationary structure and having its movable end connected to the pendulum, means for supplying fluid under pressure to the sylphon mechanism, and means for varying the pressure and the time of application thereof.

15. In a balancing machine, the combination of a pendulum member having a T-shaped head portion for supporting a body to be balanced, a fluid actuated motor device having its movable element connected to the pendulum, springs connected to the opposite and under sides of the head portion, movable members connected to the other ends of the springs, and means for simultaneously moving the movable members so as to simultaneously vary the angles of inclination of the springs to the same extent but in opposite directions.

In testimony whereof, I have hereunto subscribed my name this ninth day of April 1924.

ALEXANDER T. KASLEY.